US012699958B2

(12) United States Patent
Hutchens

(10) Patent No.: US 12,699,958 B2
(45) Date of Patent: Aug. 4, 2026

(54) INVENTORY CONTROL SYSTEMS AND METHODS

(71) Applicant: Sean Hutchens, San Diego, CA (US)

(72) Inventor: Sean Hutchens, San Diego, CA (US)

( * ) Notice: Subject to any disclaimer, the term of this patent is extended or adjusted under 35 U.S.C. 154(b) by 499 days.

(21) Appl. No.: 18/110,274

(22) Filed: Feb. 15, 2023

(65) Prior Publication Data

US 2023/0306362 A1     Sep. 28, 2023

Related U.S. Application Data

(60) Provisional application No. 63/268,211, filed on Feb. 18, 2022.

(51) Int. Cl.
*G06Q 10/087*          (2023.01)

(52) U.S. Cl.
CPC ................................. *G06Q 10/087* (2013.01)

(58) Field of Classification Search
CPC ...................................................... G06Q 10/087
See application file for complete search history.

(56) References Cited

U.S. PATENT DOCUMENTS

| | | | | |
|---|---|---|---|---|
| 8,554,364 B2 * | 10/2013 | Holmes | ................... | A47B 88/90 |
| | | | | 700/242 |
| 9,349,113 B2 * | 5/2016 | Bashkin | ................. | A47B 57/04 |
| 11,253,088 B2 * | 2/2022 | Wittig | ........................ | A47F 5/16 |
| 12,086,103 B2 * | 9/2024 | Lin | ..................... | G07C 9/00182 |
| 2003/0174099 A1 * | 9/2003 | Bauer | ................ | G06K 7/10178 |
| | | | | 343/893 |

| | | | | |
|---|---|---|---|---|
| 2009/0071854 A1 * | 3/2009 | Martin | ..................... | B25H 3/02 |
| | | | | 264/494 |
| 2012/0203376 A1 * | 8/2012 | Savage | ................ | G06Q 10/087 |
| | | | | 700/214 |
| 2013/0328661 A1 * | 12/2013 | Phillips | ............... | G06Q 10/087 |
| | | | | 715/769 |

(Continued)

FOREIGN PATENT DOCUMENTS

| | | | | |
|---|---|---|---|---|
| AU | 2003214872 A1 * | 9/2003 | | |
| CA | 3076798 A1 * | 4/2019 | ............. | G08B 23/00 |

(Continued)

OTHER PUBLICATIONS

WO2015121738 EN description with paragraph numbers translation espacenet (Year: 2015).*

*Primary Examiner* — Jacob S. Scott
*Assistant Examiner* — Erin Morris

(57)          ABSTRACT

An inventory control system for monitoring a status of a first item. A first moveable drawer, the first moveable drawer lockable in a first locked position and moveable from this first locked position to an unlocked position. A first sensor array configured to reside within the first moveable drawer, the first sensor array comprising a first plurality of sensors arranged to detect a presence of the first item. A coating sheet configured to be positioned over a surface of the first sensor array. A foam overlay positioned over a surface of the plastic coating sheet, the foam overlay defines at least one cut out that conforms to an outline of the first item. A data processing unit in operative communication with the first sensor array, the data processing unit configured to determine an inventory condition of the first item stored in the first moveable drawer.

19 Claims, 11 Drawing Sheets

(56) References Cited

U.S. PATENT DOCUMENTS

| 2014/0025543 | A1 | * | 1/2014 | Phillips | ................... | G07C 9/22 |
| | | | | | | 705/28 |
| 2017/0123399 | A1 | * | 5/2017 | Londo | ................. | G05B 19/048 |
| 2022/0076510 | A1 | * | 3/2022 | Morris | .............. | G07C 9/00912 |
| 2023/0101344 | A1 | * | 3/2023 | Wellig | ................... | F24F 11/56 |
| | | | | | | 700/276 |

FOREIGN PATENT DOCUMENTS

| CN | 107088861 | A | * | 8/2017 | ............. | B25H 3/028 |
| CN | 111267750 | A | * | 6/2020 | ............. | G01D 21/02 |
| CN | 213269367 | U | * | 5/2021 | | |
| EP | 2014424 | A1 | * | 1/2009 | ............. | B25H 3/028 |
| EP | 4331776 | A1 | * | 3/2024 | ............. | G01G 19/52 |
| GB | 2453977 | A | * | 4/2009 | ......... | G07C 9/00896 |
| GB | 2480322 | A | * | 11/2011 | ............. | B25H 3/028 |
| WO | WO-2005028165 | A1 | * | 3/2005 | ......... | G07C 9/00896 |
| WO | WO-2008096355 | A1 | * | 8/2008 | ......... | E05B 47/0603 |
| WO | WO-2009024750 | A1 | * | 2/2009 | ......... | G06Q 10/087 |
| WO | WO-2013188566 | A1 | * | 12/2013 | ............. | G07C 9/28 |
| WO | WO-2015121738 | A1 | * | 8/2015 | ............. | B25H 3/02 |
| WO | WO-2020264500 | A1 | * | 12/2020 | ........... | B65G 1/1371 |
| WO | WO-2020264506 | A1 | * | 12/2020 | ............. | B25H 3/028 |

* cited by examiner

500

5:09  Fri, Nov 4

← MyToolBoxv-10.10

Welcome To AirSupply Demo

Username   710

Password   720

ENTER

700

800

5:09  Fri, Nov 4

Please Select From The Drawers Below.

810

DRAWER1

DRAWER2

DRAWER3

DRAWER4

DRAWER5

DRAWER6

DRAWER7

INVENTORY CONTROL SYSTEMS AND METHODS

PRIORITY CLAIM

This non-provisional patent application claims the benefit of U.S. Provisional Application No. 63/268,211 filed on Feb. 18, 2022, the entirety of which is incorporated herein by reference.

FIELD

The present disclosure relates generally to inventory control and/or inventory monitoring. More particularly, the present disclosure relates to systems and methods of inventory monitoring, controlling, tracking, and/or identification of certain items, such as hand-held tools. The present disclosure is also generally directed to graphical user interfaces (GUIs) for interfacing with a hand-tool inventory control system. The present disclosure is also generally related to a system and method of ordering tools that need to be replaced.

BACKGROUND

Inventory control systems and methods may be used to monitor or track tool usage during a given time period, such as during the day, during the week or during a work shift. Such systems and methods may also be used to identify when tools are taken from a particular location (e.g., such as a toolbox or other like storage system or mechanism) for use.

Such systems and methods may also be utilized to monitor or record when these inventoried items are returned after they are used or removed from their original location within a particular location. Being able to track and monitor the flow of these types of items has certain advantages. As an example, such advantages include limiting tool loss or limiting tool theft. As just another advantage, such systems and methods may be used to track the amount of item or tool usage, thereby providing one measure of tool usage allowing the ability to gauge or provide suggested upgrades, item/tool updates. These systems can also extend the useful life of certain items that might require periodic maintenance and/or recalibration.

In addition, such systems may also be used to record or monitor which tools are being used and for how long these tools are being used, in case certain such tools will need maintenance or need for recalibration. Such systems and methods may also monitor and record which tools are being used by whom, such as a particular person, technician, or mechanic.

In addition, such systems and methods may be used to monitor the status of the tool. That is, whether a specific tool is in a functional or non-functional state. That is, if the tool is broken and needs to be replaced or perhaps needs refurbishing. These systems may also be used to determine if new tools may need to be ordered or repaired. In addition, such systems and methods may be configured to assist or play a role in the ordering of new items and if it is determined that new items need to be ordered.

SUMMARY

According to an exemplary arrangement, an inventory control system for monitoring a status of a first item is disclosed. The system comprises a first moveable drawer, the first moveable drawer lockable in a first locked position and moveable from this first locked position to an unlocked position. A first sensor array configured to reside within the first moveable drawer, the first sensor array comprising a first plurality of sensors arranged to detect a presence of the first item. A coating sheet configured to be positioned over a surface of the first sensor array. A foam overlay positioned over a surface of the plastic coating sheet, the foam overlay defines at least one cut out that conforms to an outline of the first item. A data processing unit in operative communication with the first sensor array, the data processing unit configured to determine an inventory condition of the first item stored in the first moveable drawer.

In one arrangement, the system comprises a second sensor array configured to reside within the first moveable drawer, the second sensor array comprising a second plurality of sensors arranged to detect a presence of a second item. In one arrangement, the first item is different than the second item. In one arrangement, the second item comprises a hand tool.

In one arrangement, the system comprises an electromagnetic locking system for locking the first moveable drawer in the locked position. For example, in one arrangement, the electromagnetic locking system locks a second moveable drawer in a locked position. In an arrangement, the second moveable drawer is moveable from this second locked position to an unlocked position. In one arrangement, the electromagnetic locking system comprises a solenoid driver operatively coupled to a solenoid. Activation of the solenoid driver energizes the solenoid to thereby allow the first moveable drawer to move from the first locked position to the unlocked position.

In one arrangement, the system further comprises a plurality of standoffs positioned adjacent each sensor within the first sensor array.

In one arrangement, the system further comprises a network device operatively coupled to the processing unit of the inventory control system. As just one example, the network device is in communication with a second inventory control system. In one arrangement, the network device is in wireless or wired communication with the second inventory control system.

In one arrangement, the system further comprises a computing device operatively coupled to the data processing unit. For example, in one arrangement, the computing device comprises a tablet, wherein the tablet is mounted on a swivel arm operatively coupled to a container. In one arrangement, the container comprises a toolbox comprising a first moveable drawer.

In one arrangement, the first sensor array is arranged in an outline form of the first item.

In one arrangement, the first sensor array comprises a plurality of Infra Red (IR) sensors.

In one arrangement, the first sensor array comprises a plurality of daughter boards, wherein the plurality of daughter boards are operatively coupled to the computing device. In one arrangement, the sensor array further comprises a flexible printed circuit board wherein the plurality of daughter boards are operatively coupled to the flexible printed circuit board.

In one arrangement, the coating sheet comprises a multilayered plastic sheet.

In one arrangement, the inventory condition of the first item comprises a present condition.

In one arrangement, the inventory condition of the first item comprises an absent condition.

In one arrangement, the inventory condition of the first item represents a condition of whether the first item resides within the first cut out of the foam overlay.

In one arrangement, the inventory condition of the first item represents a condition of whether the first item needs to be ordered as a new item. For example, this present condition may relate to whether the first item will need to be re-ordered from the seller or the provider or manufacturer of the inventory control system.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and descriptions thereof, will best be understood by reference to the following detailed description of one or more illustrative embodiments of the present disclosure when read in conjunction with the accompanying drawings, wherein:

DETAILED DESCRIPTION

The following detailed description describes various features and functions of the disclosed systems and methods with reference to the accompanying figures. The illustrative system and method embodiments described herein are not meant to be limiting. It may be readily understood that certain aspects of the disclosed systems and methods can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Figure 1:
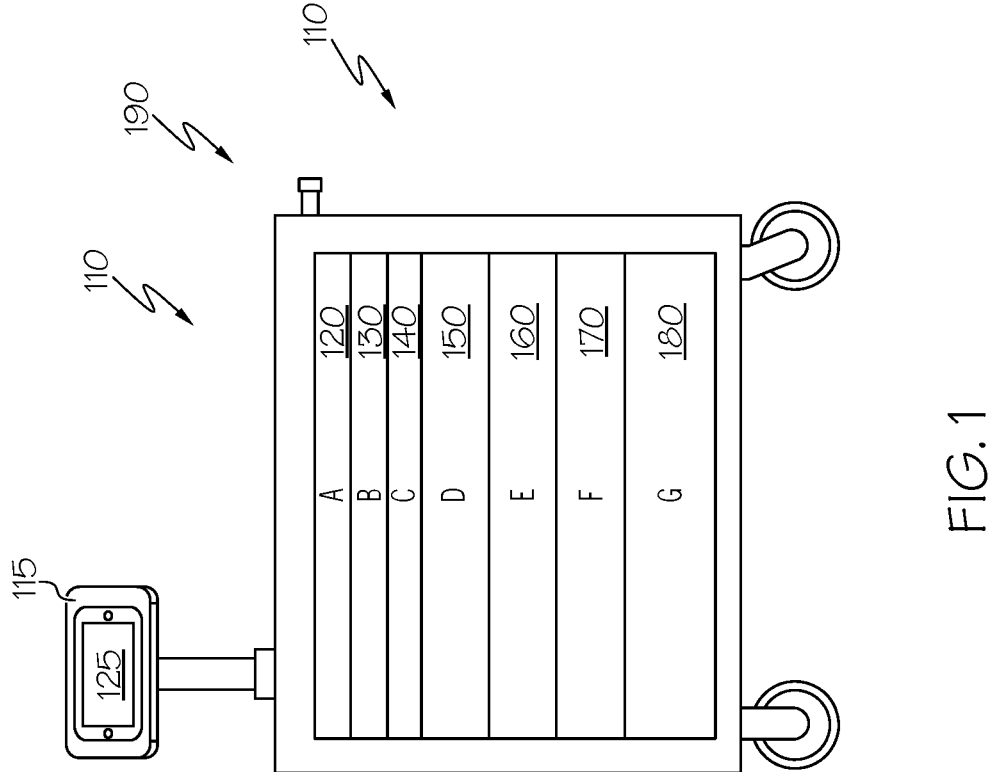
FIG. 1 illustrates a perspective view of inventory control system, according to an example embodiment.

FIG. 1 illustrates a perspective view of an inventory control system 100 according to an exemplary embodiment. As illustrated, the inventory control system 100 comprises an inventory control system for monitoring a status of a first item, such as a tool or a hand-tool. As illustrated, the inventory control system comprises an inventory control system for monitoring and tracking a status of multiple items in multiple drawers of a container, such as a toolbox 110. For example, the multiple items comprise multiple hand-tools, such as flashlights, hammers, screwdrivers, wrenches, files, awls, tape measures, and the like.

The inventory control system 100 comprises a structure or container or enclosure (e.g., a toolbox) comprising at least a first moveable drawer 120. The first moveable drawer 120 is preferably lockable in a first locked position. In other words, the contents of the first moveable drawer 120 cannot be accessed unless the drawer is placed within an unlocked or opened state. The first moveable drawer 120 is also moveable from this first locked position to an unlocked position. In the locked position, individuals cannot remove items contained within the drawer. In addition, in the locked position, individuals cannot return items back to a drawer.

Alternatively, in the unlocked position, authorized individuals can remove items contained within the drawer 120. In one preferred arrangement, the system can monitor the removal as well as the return of the various items contained in each of the drawers of this system. In one preferred arrangement, the system can monitor and can record the individual, or user or person removing as well as returning particular items within the system. In addition, in one preferred arrangement, the system 100 can also record when such items were returned as well as the state of the item upon its return. As just one example, an item's state may relate to whether the item needs maintenance, whether the item needs to be recalibrated, whether the item needs refurbishing, or whether the item needs to be re-ordered as a new item.

As illustrated, in this particular control system arrangement, this control system includes seven (7) different drawers: 120, 130, 140, 150, 160, 170, and 180. In FIG. 1, these seven (7) different drawers are marked A-G. In one preferred arrangement, each drawer A-G within this container structure 110 may be structurally configured similar to one another. However, as will be described, each drawer A-G may be structured so as to contain either the same types of items or tools or perhaps structured so as to contain dissimilar types of items or tools. As those of ordinary skill in the art will recognize, alternative drawer configurations, structures, and internal drawer contents may also be utilized as well.

In one preferred arrangement, the system 100 further comprises a locking system or a drawer lock mechanism 190. Specifically, a locking system 190 for locking and unlocking the various drawers A-G contained within the inventory control system 100. Such a locking system 190 can be used to prevent unauthorized access to the inventory system. As an example, such a locking system 190 may comprise an electronic locking system. In an alternative arrangement, such a locking system 190 may comprise an electro-mechanical locking system. As just one example, such an electronic locking system 190 may comprise an electromagnetic locking system. For example, such an electromagnetic locking system can be utilized for locking the first moveable drawer 120 in a locked position. In yet an alternative arrangement, such an electromagnetic locking system can be utilized for locking all of the moveable drawers A-G in a locked position.

In one preferred arrangement, the locking system 190 may comprise a timed locking system. For example, in one arrangement, after a user properly logs into the inventory control system, a computing device will send a signal to digital controller and this controller will energize the proper magnetic lock within the system. In one arrangement, this energizing comprises a timed energization, for example for five (5) seconds. With such a timed energization, the unlocked drawer will remain unlocked for a certain period time and the user will need to then pull out or open the drawer within this time frame. In other words, the user must open the drawer within this five (5) second unlocked period of time. If access to the drawer is not obtained within this time frame, the inventory control system will re-lock the previously unlocked drawer.

In one arrangement, the system 100 includes an electro-magnetic locking system that locks a second moveable drawer in a locked position. Similar to the first moveable drawer, the second moveable drawer is moveable from this second locked position to an unlocked position. In yet an alternative arrangement, a separate locking system may be utilized to lock just one drawer or alternatively lock a subset of multiple drawers. As just one example, a first locking system may be utilized to lock a first and second moveable drawer 120, 130. Similarly, the inventory system may comprise a second locking system that is utilized to lock a third and a fourth moveable drawer 140, 150 within the same inventory system 100. These locking systems may operate either dependently of one another or independently of one another. In other words, unlocking certain drawers may or may not unlock all or some of the drawers residing in a particular container or toolbox.

In one arrangement, the electromagnetic locking system comprises a solenoid driver. In such a system, the solenoid driver may be operatively coupled to a solenoid. In such an exemplary system, activation of the solenoid driver energizes the solenoid to thereby allow the first moveable drawer to move from the first locked position to the unlocked position. Energizing this solenoid may also allow other moveable drawers within the container to become unlocked as well.

Figure 5:
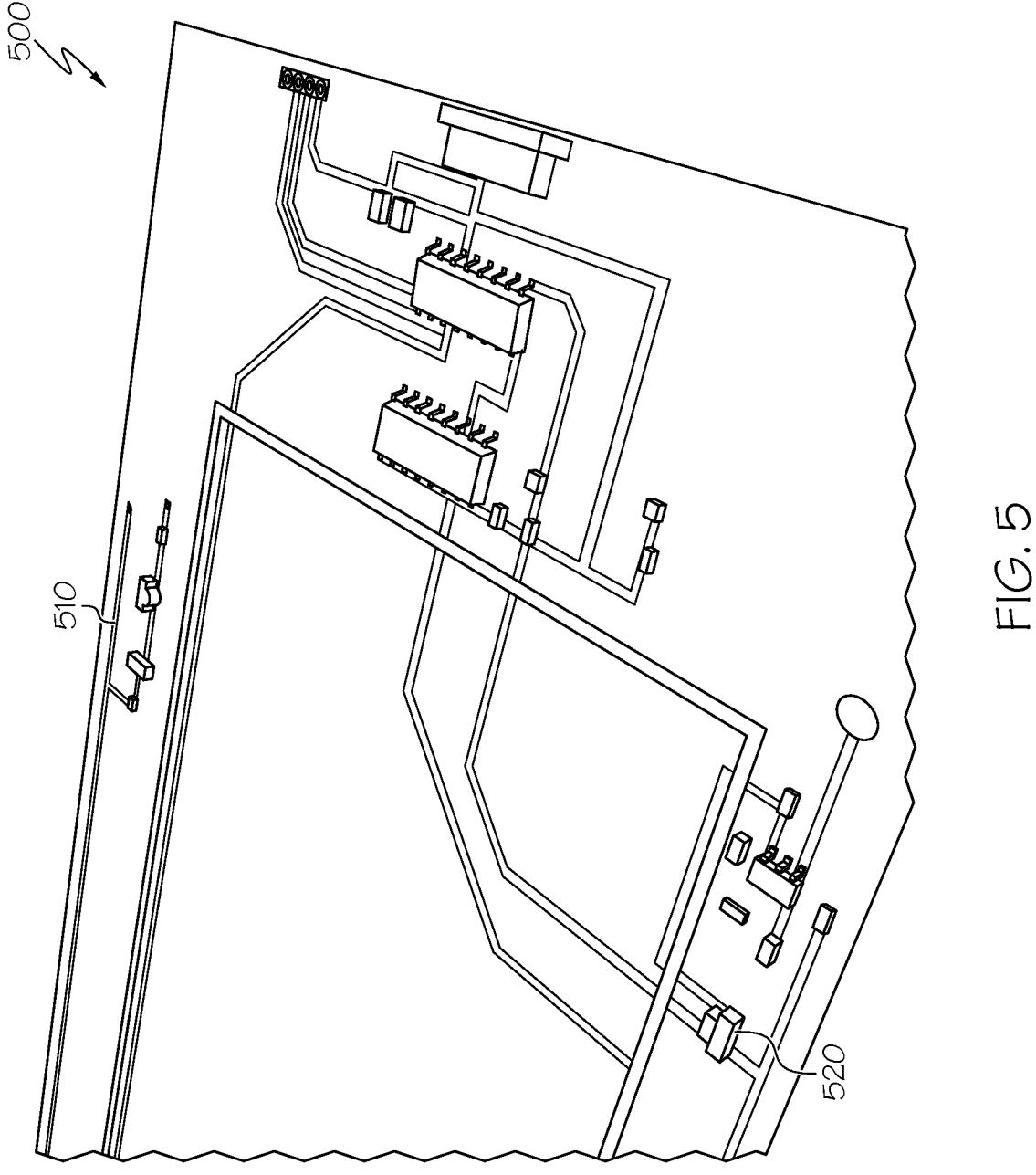
FIG. 5 illustrates a sensor printed circuit board for use with an inventory control system, such as the inventory control system illustrated in FIG. 1.

In order to monitor an inventory condition of one or more tools, a first sensor array is configured to reside within the first moveable drawer 120. FIG. 5 illustrates a sensor printed circuit board 500 for use with an inventory control system, such as the inventory control system 100 illustrated in FIG. 1. For example, the first sensor array 500 may comprise a first plurality of sensors 510 that are arranged within a moveable drawer, such as the first moveable drawer 120. These sensors 510 may be configured so as to detect a presence of the first item. In one preferred arrangement, the first sensor array 510 is arranged in an outline form of the first item. That is, the first sensor array 510 may comprise a plurality of sensors and the plurality of sensors may be arranged in an outline form of the first item. As just one example, where the first item comprises a hand tool (e.g., screwdriver), the plurality of sensors may be arranged in an outline form of this hand tool (e.g., arranged to duplicate the outline form of the screwdriver).

The sensor array 510 may comprise one or more different types of sensors. The sensor selection may be based on a number of criteria including sensor sensitivity, space constraints, item geometrical configuration, and item materials. As just one example, in one arrangement, the first sensor array comprises a plurality of Infra Red (IR) sensors. As just one example, the IR sensor comprises an active infrared sensor that is configured to emit infrared radiation and also detect infrared radiation. In one arrangement, the active IR sensor comprises two component parts: a transmitter or light emitting diode and a light emitting receiver. In one arrangement, such an IR sensor can be placed within a printed circuit board configuration and then a tool can be placed adjacent one or more of such IR sensors. Thereafter, a sensitivity of the IR sensors can then be adjusted so that when a tool is positioned within a certain depth of view of the IR sensor, the infrared light that is emitted from the LED or transmitter will then reflect off of the tool's surface and this emitted and then reflected light will be detected by the IR sensor's receiver. Each tool contained within a certain drawer configuration may comprise one or more of such sensors that will each need to be sensitivity adjusted based on the location of the sensor with respect to the tool surface and the nature of the tool's surface at that particular location, such as the tool surface reflectivity.

In an alternative arrangement, the system further comprises a second sensor array. 520 that is configured to reside within the first moveable drawer 120. For example, the second sensor array 520 may comprise a second plurality of sensors that are arranged to detect a presence of a second item. This second item may be the same as or may be different from the first item. For example, the first item may be a hand tool while the second item may not be a hand tool. In one preferred arrangement, the second plurality of sensors 520 are arranged to detect the presence of a second hand tool. This second plurality of sensors 520 may be the same as or may be different in structure and function as the first plurality of sensors.

In one arrangement, the first sensor array comprises a plurality of daughter boards. In such a configuration, the plurality of daughter boards are operatively coupled to the computing device. In one arrangement, the sensor array further comprises a flexible printed circuit board wherein the plurality of daughter boards are operatively coupled to the flexible printed circuit board.

In an arrangement, the inventory system 100 may further comprise a plurality of standoffs or spacers that are positioned adjacent each sensor within the first sensor array. In one preferred arrangement, these standoffs comprise aluminum standoffs that are positioned through a top layer of the foam cut out, through a bottom layer foam through the bottom of the toolbox which has prefabricated holes for the bottom of the bolt. This secures the entire assembly in the box. In one preferred arrangement, there a plurality of standoffs that are provided for each drawer. For example, in one standoff configuration, two standoffs are provided on each side of a drawer and one standoff is provided in the middle of the drawer.

Returning to FIG. 3, the inventory system further comprises a coating sheet 320 that is configured to be positioned over a surface of a PCB/sensor board 310, like the first sensor array 510 illustrated in FIG. 5. For example, such a coating sheet 320 may comprise a coating sheet that comprises a multi-layered sheet. As just one example, such a coating sheet 320 may comprise a coating sheet that comprises a multi-layered plastic sheet. In one preferred arrangement, the coating sheet 320 comprises a four layered (PI) polyamide material having a thickness or about 0.1 millimeter.

Figure 3:
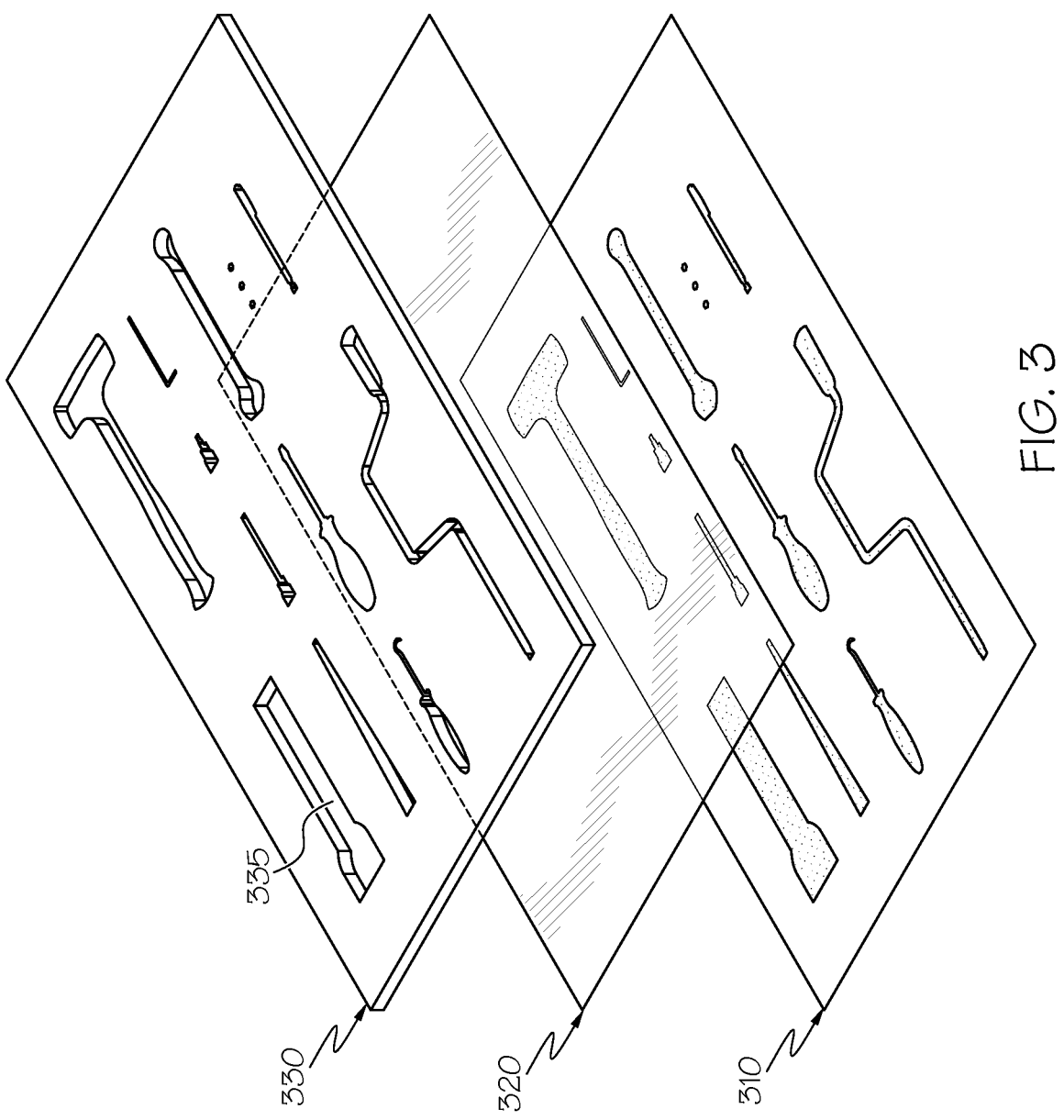
FIG. 3 illustrates various component parts for use with an inventory control system, such as the inventory control system illustrated in FIG. 1.
Figure 4:
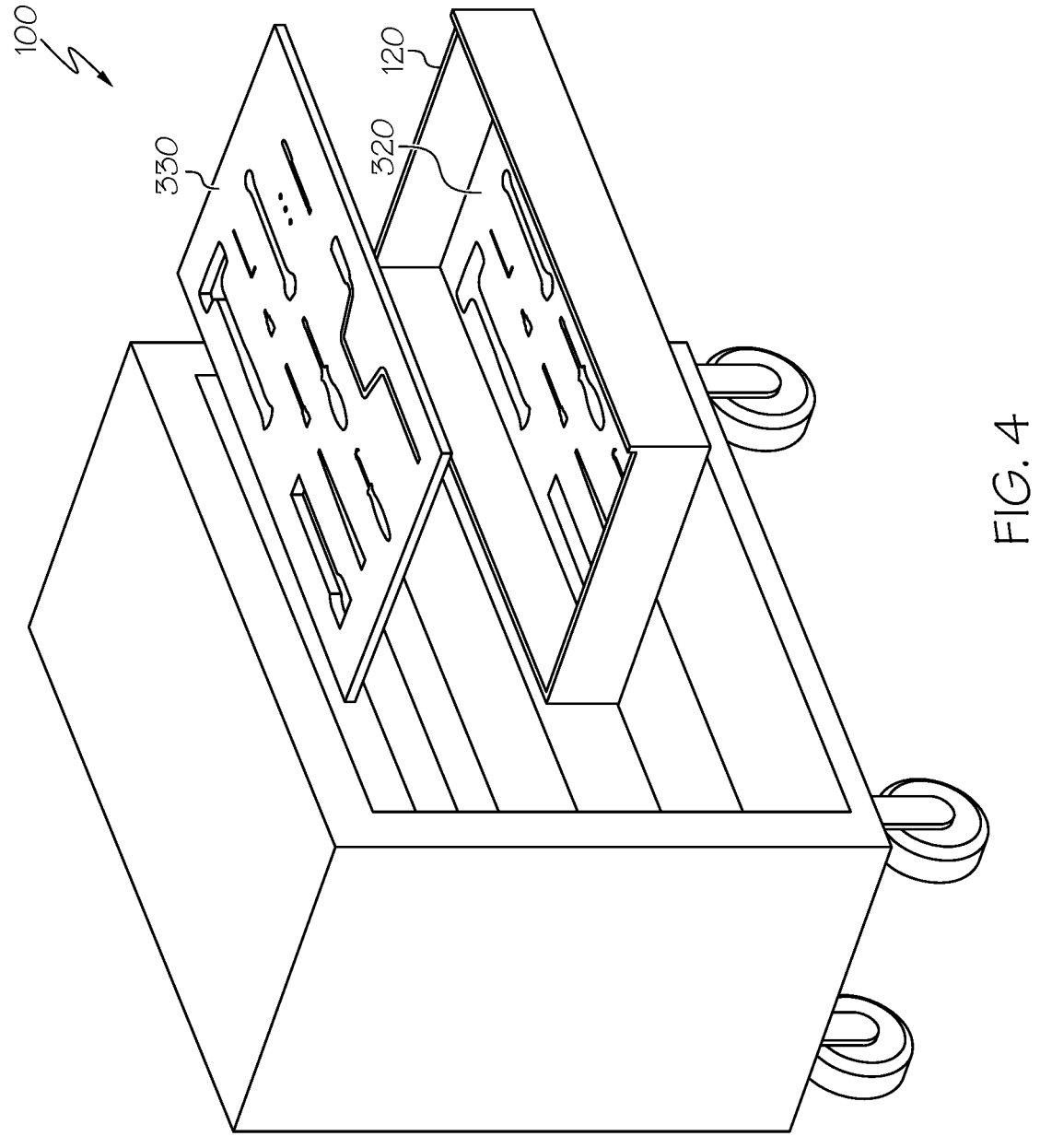
FIG. 4 illustrates various component parts for use with an inventory control system, such as the inventory control system illustrated in FIG. 1.

FIG. 3 illustrates various component parts for use with an inventory control system, such as the inventory control system 100 illustrated in FIG. 1. Specifically, FIG. 3 illustrates the plastic coating sheet 320 residing between the foam cutouts 330 and the sensor printed circuit board 310. As noted, all three components 310, 320, 330 are shaped in a similar configuration. For example, all three components 310, 320, 330 are rectangularly shaped and have similar geometrical configurations and dimensions. This will allow these various components parts 310, 320, 330 to be properly situated within a drawer of a container, such as a toolbox. As just one example, FIG. 4 illustrates how these component parts 310, 320, 330 are layered or positioned with respect to one another within a toolbox drawer.

The system 100 further comprises an overlay 330 that is positioned over a surface of the plastic coating sheet 320. As just one example, the overlay 330 comprises a foam overlay that defines at least one cut out or at least one recess 335 that conforms to the shape of an item, such as a hand-tool. In this illustrated arrangement, the at least one cut out 335 comprises an outline of the first item. The foam overlay 330 may also define multiple cut outs that conforms to an outline of other types of items. In one preferred arrangement, the foam overlay 335 comprises rigid ⅜" thick extruded PVC that is fabricated by way of a waterjet cut.

Figure 2:
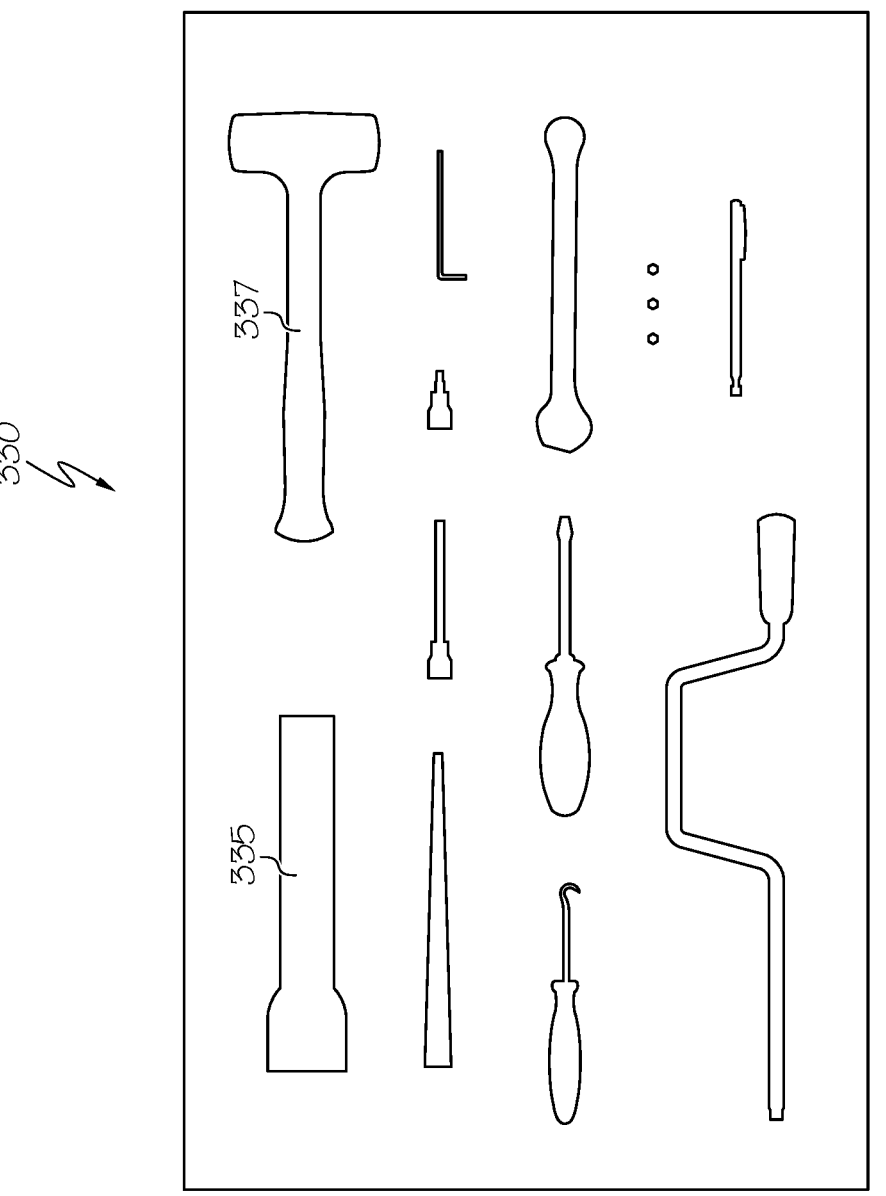
FIG. 2 illustrates a cutout for use with an inventory control system, such as the inventory control system illustrated in FIG. 1.

As just one example, FIG. 2 illustrates an exemplary foam overlay 330. As can be seen from FIG. 2, the foam overlay comprises eleven (11) cut outs defining multiple cut outs that conform to various outline shapes. For example, a first cut out 335 represents the shape of a flashlight and a second cut out 337 represents the shape of a hammer. Advantageously, the tool storage locations comprise a set of individually shaped recesses for receiving the tools. Such a structure can act to ensure that the items are always returned to a proper and corresponding cut out. One benefit of such a structure is that it possible for the system to identify which tools have been removed without having to utilize some type tagging devices on the tools.

Returning to FIG. 1, the inventory control system 100 further comprises a data processing unit 115. The sensor array 500 illustrated in FIG. 5 is operatively coupled to a data processing unit 115 and this data processing unit 115 is operatively coupled to a data display 125. This data processing unit 115 may be mounted directly or indirectly to the container 110 housing the drawers A-G. The data processing device 115 is operatively configured to receive signals from the sensors and has an output cable for transmitting signals to a computer having database software for maintaining an inventory of the tools in the container. The data processing device 115 may be in wired or wireless communication with the plurality of sensors contained within the sensor array. In addition, the control unit can be connected to a remote computer or network wirelessly, for example via an infrared; radio or GSM link.

In one preferred arrangement, the data processing unit 115 is in operative communication with the first sensor array 500. In one preferred arrangement, the processing unit 115 comprises an ARM-Cortex-M4. The Cortex-M4 is a high-performance embedded processor developed to address digital signal control markets that demand an efficient, easy-to-use blend of control and signal processing capabilities. As those of ordinary skill in the art will recognize, alternative processors or processor arrangements can also be utilized.

In one preferred arrangement, the data processing unit 115 may be used to process data to determine one or a plurality of inventory control parameters. As just one example, the data processing unit 115 may be configured to determine an inventory condition of the first item stored in the first moveable drawer 120. As just one example, the data processing unit 115 may be configured to determine an inventory condition wherein the inventory condition of the first item comprises an absent condition. That is, the data processing unit 115 can determine whether the first item resides within the first drawer 120 or whether the first item is absent from the first drawer 120. Specifically, the data processing unit 115 can determine, with corresponding inputs from the sensor array 500, whether the first item resides within a specific cutout of a specific foam overlay 330 within the first drawer. The data processing unit 115 can also determine whether the first item is absent from a specific cutout of a specific foam overlay 330 within the first drawer 120. The data processing unit 115 can also determine whether the first item has been incorrectly placed within the specific cutout of the specific foam 330. That is, the data processing unit 115 can determine if an incorrect tool has been placed within a specific cutout. In addition, the data processing unit 115 can determine if a correct tool has been incorrectly placed within the correct specific cutout for that item. For example, this may occur where the item is incorrectly seated or not properly seated within the correct specific cutout for that item.

Figure 6:
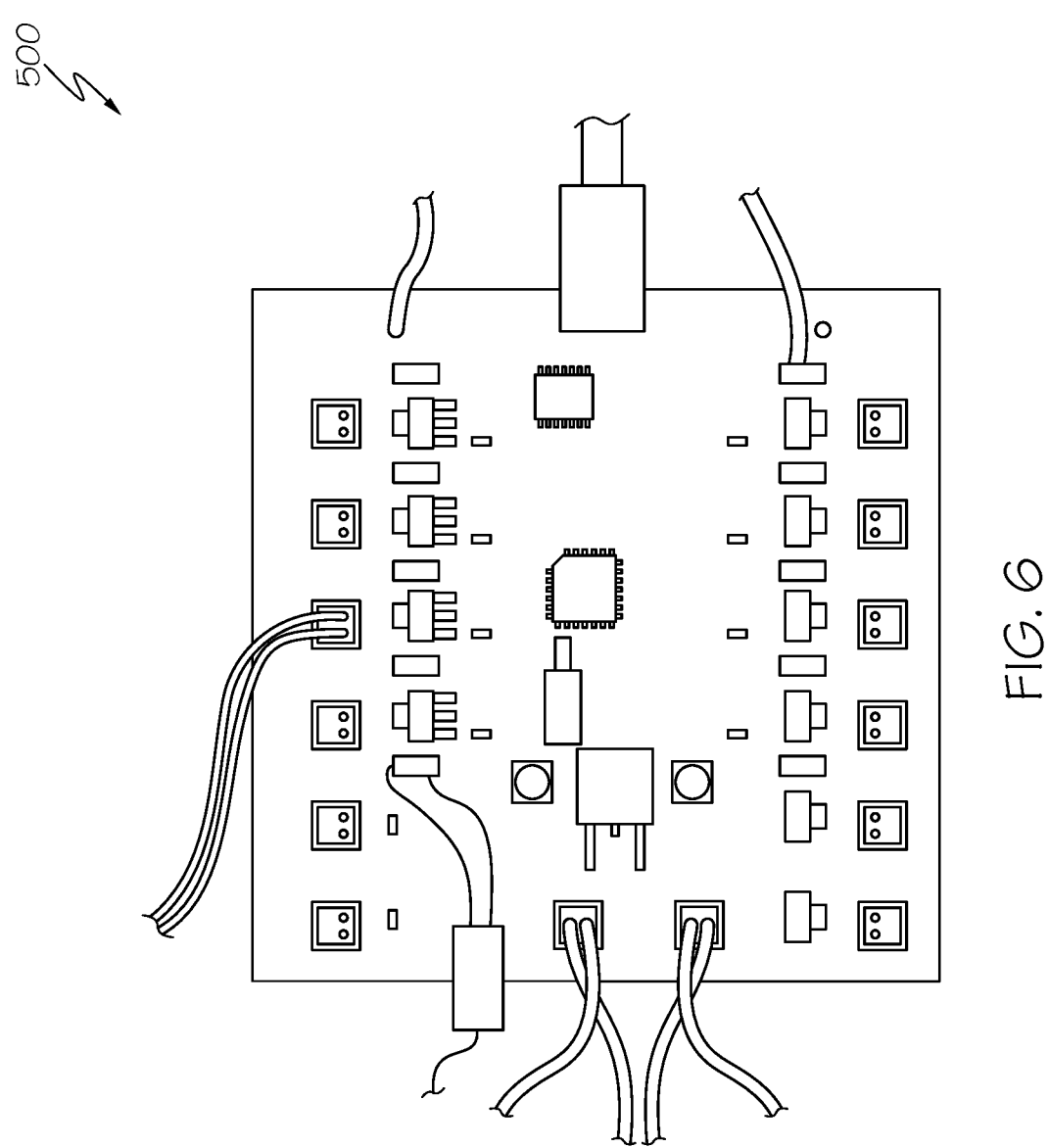
FIG. 6 illustrates a data processing unit for use with an inventory control system, such as the system illustrated in FIG. 1.

FIG. 6 illustrates an exemplary data processing device 600 for use with an inventory control system, such as the inventory control system 100 illustrated in FIG. 1.

As can be seen from FIG. 6, the data processing device 600 comprises a main printed circuit board 610 wherein this main printed circuit board comprise various connections. A first main connection (black wire on the right) 620 couples the printed circuit board 610 to a computing device, such as the computing device 115 illustrated in FIG. 1. A second main connection (grey wire) 630 couples the printed circuit board 610 to the plurality of sensors residing in the printed circuit board situated within the drawer. Additionally, the smaller black/red wires 640 are coupled to the smaller wire which couples the data processing device to a power supply, such as 110 volt transformer. And then finally, the wire at the top of the printed circuit board couples the data processing device to the locking mechanism that locks and unlocks the various drawers within the inventory control device as described in detail herein.

FIG. 5 illustrates a sensor printed circuit board 500 for use with an inventory control system, such as the inventory control system 100 illustrated in FIG. 1. As illustrated, the sensor printed circuit board 500 comprises a plurality of sensors 510 which may or may not comprise optical sensors as discussed herein. As just one example, these sensors 510 may comprise IR sensors.

In yet an alternative arrangement, the system further comprises a network device that is operatively coupled to the processing unit of the inventory control system. In one arrangement, the network device is in communication with a second inventory control system. In this manner, the network device can communicate via a wired or wireless network. The network device can transmit item data to and from the monitoring system. Such item data may include item data that describes when specific items are removed and/or returned to the inventory control system. Such item data may be beneficial where items need to be tracked and monitored remotely from where the system is located. For example, such a network device would allow a remotely maintained administer to remotely monitor and control certain inventory events occurring at multiple inventory control systems located over a large, disbursed geographical area.

In one preferred arrangement, the network device comprises a CAN BUS. CAN BUS comprises a Controller Area Network bus standard that is designed to allow microcontrollers and device to communicate with each other's applications with a need for a host computer. Specifically, it allows various nodes or electronic control units' (ECUs) to be interconnected with one another, allowing information from one part of the inventory control system to be shared with another part of the inventory control system. In one preferred arrangement, this CAN BUS comprises a CAN BUS provided by NXP Semiconductors NV.

The disclosed inventory control system 100 monitors, tracks, and saves to memory certain inventory conditions. For example, in an alternative arrangement, the inventory condition of the first item represents a condition of whether the first item properly resides within the first cut out of the foam overlay. In other words, the inventory condition of the first item represents whether the first item is properly seated within a specific cutout of a specific foam overlay within the first drawer. As just one example, such an inventory condition may represent whether a screwdriver is correctly placed or properly seated within the screwdriver cutout of the specific foam overlay.

In yet an alternative arrangement, the system 100 further comprises a computing device operatively coupled to the data processing unit. In one arrangement, the computing device comprises a handheld computing device, such as a tablet. In one preferred configuration, the tablet is mounted on a swivel arm that is operatively coupled to a container, such as a toolbox comprising the first moveable drawer. As those of ordinary skill in the art will recognize, other tablet configurations may also be utilized.

In one preferred arrangement, the data processing device comprises storage for recording certain item information. Such item information may include the day and time when a particular item is removed from the drawer as well as the day and time when the particular item is returned to the drawer. Such information may also record the user checking out or withdrawing the item from the storage container. Such information may also record a user input project name or event identifier which can be used by the system to track inventory events as it may related to a specific job or project. In addition, such information may also include the SKU (unique identifier for each tool in each kit) along with the manufacturer's part number.

Figure 7:
FIGS. 7-10 illustrate various screen shots for a Graphical User Interface (GUI) for use with an inventory control system, such as the inventory control system illustrated in FIG. 1.

FIGS. 7-10 illustrate various screen shots for a Graphical User Interface (GUI) for use with an inventory control system, such as the inventory control system illustrated in FIG. 1. For example, FIG. 7 illustrates an exemplary screen shot of a user sign-in GUI 700 for use with such an inventory control system. As illustrated, when a user first attempts to start the inventory control system, the system will prompt the user for a username 710 and a user password 720. In one arrangement, the system may utilize a listing for authorized users for the entire system. That is, the system may have one list of authorized users and each of these users may have unlimited access to the various drawers and tools contained within those drawers. If an unauthorized user attempts to gain access to the inventor control system by entering an authorized users name or an incorrect password, the system will generate an error and perhaps provide an error message.

In an alternative arrangement, the system will have limited authorized use of the various items contained within the drawers of the system. As just one example, the system may have certain items contained within certain drawers that only certain authorized individuals can excess.

As an example, perhaps there might be two lists of authorized users, authorized user list A and authorized user list B. And perhaps the user access may be so structured that those individuals appearing on authorized user list A only have access to those items or tools contained within certain drawers, for example, they are limited to the tools only in first drawer and the second drawer. Similarly, perhaps the user access may be so structured that those individuals appearing on authorized user list B only have access to those items or tools contained within certain drawers, for example, they are limited to the tools only in third drawer and the fourth drawer.

Once the user has entered his or her name, the user will also need to enter a password. If the user appears to enter a name of an authorized user and the correct password has been entered, the user will be provided access to the inventory control system.

Figure 8:
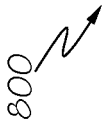

Once access has been provided, the inventory control system will prompt the user with the screen shot such as the Graphical User Interface (GUI) 800 illustrated in FIG. 8. As illustrated in FIG. 8, the user is prompted to select a drawer in which the user will either select an item for use or return an item. As illustrated, this GUI identifies eight drawers 810 for user selection. In the situation where the user is authorized access to all eight drawers, if the user selects a particular drawer, a locking mechanism for that particular drawer will disengage and the drawer will become unlocked and will be allowed to be opened.

Alternatively, in the situation where the user is not authorized access to all eight drawers but only certain selected drawers, if the user selects a particular authorized drawer, a locking mechanism for that particular drawer will disengage and the allow the selected drawer to be opened. However, if the user selects a particular un-authorized drawer, a locking mechanism will prevent the drawer from disengaging and the drawer will not be allowed to be opened, thereby preventing access to the contents of the selected drawer. In one arrangement, the system may provide a graphical notice or alarm indication that the user has selected an unauthorized drawer and therefore the user should select an alternative drawer.

Figure 9:
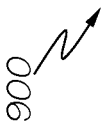

If the user selects an authorized drawer, the system will unlock the drawer and provide access to the drawer's contents. In addition, the user will be provided with a graphical display 900 as illustrated in FIG. 9. As illustrated in FIG. 9, a graphical illustration of the drawer's current contents is illustrated. In this exemplary illustration, the system confirms that the drawer contains eight (8) items and that these eight (8) items are all properly seated within the cutouts contained within the drawer. In one arrangement, the proper seating of these items within the drawer is visually depicted by the color of the illustrated tool or item. Note that in FIG. 9, all of the items are illustrated in a green color. This green color indicates that the item is contained within the cutout and that the item is also properly seated within this cutout. In the event that a tool was not contained within its respective cutout and therefore missing from the drawer, the item or tool would be noted in an alternative color, such as a red color.

Figure 10:
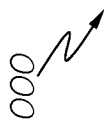

For example, FIG. 10 illustrates a screen shot 1000 where one of the items—a screwdriver 1010—has been removed from the drawer and therefore the image of this item denoted by the identifier—84CA—is noted in red in the graphical display. And in the event that a tool is contained within its respective cutout but is not properly seated within this cutout, the item or tool would be noted in yet another alternative color, such as a yellow color.

Aside from a color indication, each item illustrated in FIG. 9 also has a number illustrated. In one arrangement, this number represents an internal product code or alternative could representing a catalog number for this item. As just one example, one of the items represented in the display 900 illustrated in FIG. 9 represents a flashlight and this flashlight is denoted with the following number "459-ST2D016." This number can be provided in order to enable a user of the inventory control system to more easily order a new item in the event that this item is either lost or no longer functional. As illustrated, the remainder item images denoted in FIG. 9 have similar item identifiers.

Returning to the login GUI 700 illustrated in FIG. 7, in an alternative arrangement, another link might be provided. For example, the initial screen might be provided a user for a specific job name or project identifier when logging into the system. In one arrangement, this field and the information added to this project field will be viewable by an administrator of this system. The system, and in one arrangement, the administrator of the system can monitor or track the user for this project, when the user logged into the system, and for how long this user is logged in for this particular project or job.

Figure 11:
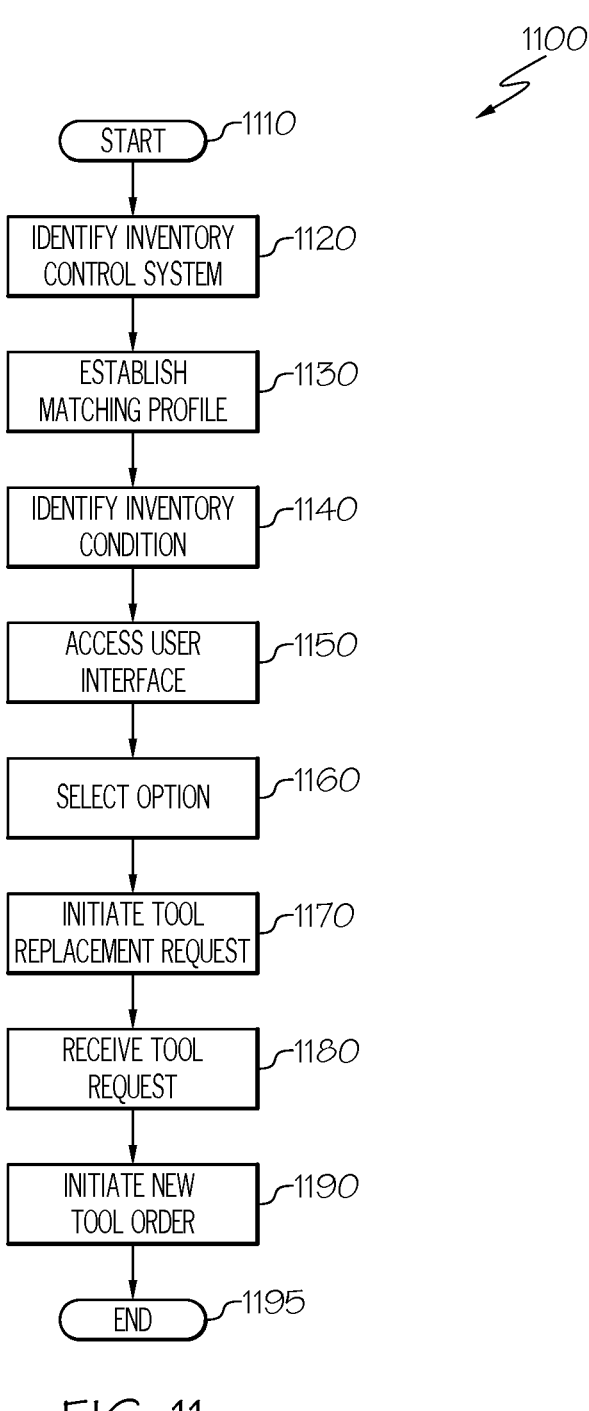
FIG. 11 illustrates a method of use for an exemplary inventory control system for use with a container, such as the inventory control system illustrated in FIG. 1.

FIG. 11 illustrates a method 1100 for inventory control. As just one example, this method 1100 may be utilized by an inventory control system, such as the inventory control system illustrated in FIG. 1. The method begins at step 1110 and proceeds to steps 1120 where the method performs the step of identifying an inventory control system comprising a plurality of tools. For example, in one arrangement, the inventor system would comprise the inventory control system as illustrated in FIG. 1 comprising a toolbox comprising a plurality of drawers, wherein the plurality of drawings contain a plurality of tools.

And such an inventory control system would monitor usage of the tools contained within the toolbox as to how long the tools have been checked out, the status of the tools when they are returned. After step 1120, the method proceeds to step 1130 where the method includes establishing a matching profile of each tool contained within the inventory control system. As just one example, the fabricator or manufacturer or seller or provider of the inventory control system can generate or create a matching profile. For example, such a matching profile can be created that includes an identifier of each tool contained within the inventory control system, including the manufacturer of the tool, the manufacturer's reference number for the tool, the fabricator's reference number for the tool as well as the fabricator's reference number for the overall inventory control system. In addition, the fabricator could also assign a SKU or a Stock Keeping Unit to the inventory control system. This SKU can act as a unique identification number that defines an inventory control system at the identifiable inventory level; for example, in this commercial applications, the SKU may designate the type of tools contained within each drawer, the production number of the control system, and the manufacturer and manufacturers' part number for each tool contained within the system.

The method then proceeds to step 1140 where the method performs the step of identifying an inventory condition of a first tool within the plurality of tools. As explained in detail herein, such an inventory condition of the tool may be that the tool is missing from the container, that the tool is broken and cannot be used for its intended purpose, that the tool is worn and needs a certain level of maintenance, or that the tool needs recalibration.

Next, the process 1100 proceeds to step 1150 where the method performs the step of accessing a user interface to the inventory control system. For example, a user of the inventor control system may access a user interface similar to the user interface illustrated in FIGS. 7 through 10. As just one example, the illustrated user interface may comprise a link or a menu or a pull-down menu that is designated "Order Entry" that the user of the inventory control system can use to initiate a process of ordering a new tool to be used with the inventory control system.

As just one example, to the extent that the user interface has such a key or a link, the process will proceed to step 1160 where the user selects an option provided by a user interface device of the inventory control system. Such a selection will begin the order entry of a new tool for use with the inventory control system.

After interfacing with the user interface at step 1160, the method proceeds to step 1170 where the process performs the step of initiating a first tool replacement request via an API to an inventory control system provider, the replacement request transmitted by way of a hardwire or softwire transmission. Then, the process 1100 proceeds to the step 1180 of receiving the first tool replacement request. For example, the original equipment manufacturer or fabricator of the inventory control system could be the entity that receives such a first tool replacement request. Then, the method 1100 proceeds to step 1190 where the entity receiving the tool replacement request then initiates an order to be placed based on the first tool replacement request. The method 1100 ends at step 1195.

The description of the different advantageous embodiments has been presented for purposes of illustration and description and is not intended to be exhaustive or limited to the embodiments in the form disclosed. Modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

I claim:

1. An inventory control system for monitoring a status of a first item, the inventory control system comprising:
   a first moveable drawer, the first moveable drawer lockable in a first locked position and moveable from this first locked position to an unlocked position;
   a first sensor array configured to reside within the first moveable drawer, the first sensor array comprising a first plurality of sensors arranged to detect a presence of the first item;
   wherein the first sensor array comprises a plurality of daughter boards,
   a coating sheet configured to be positioned over a surface of the first sensor array;
   a plurality of standoffs positioned adjacent each sensor within the first sensor array;
   a foam overlay positioned over a surface of the coating sheet;

wherein the plurality of standoffs are positioned through a top layer of the foam overlay and through a bottom of the first moveable drawer, wherein the foam overlay defines at least one cut out that conforms to an outline of the first item, and a data processing unit in operative communication with the first sensor array, the data processing unit configured to determine an inventory condition of the first item stored in the first moveable drawer.

2. The system of claim 1 further comprising a second sensor array configured to reside within the first moveable drawer, the second sensor array comprising a second plurality of sensors arranged to detect a presence of a second item.

3. The system of claim 2 wherein the first item is different than the second item.

4. The system of claim 2 wherein the second item comprises a hand tool.

5. The system of claim 1 further comprising an electromagnetic locking system for locking the first moveable drawer in the locked position.

6. The system of claim 5 wherein the electromagnetic locking system locks a second moveable drawer in a locked position, the second moveable drawer moveable from this second locked position to an unlocked position.

7. The system of claim 5 wherein the electromagnetic locking system comprises a solenoid driver operatively coupled to a solenoid, wherein activation of the solenoid driver energizes the solenoid to thereby allow the first moveable drawer to move from the first locked position to the unlocked position.

8. The system of claim 1 further comprising a network device operatively coupled to the data processing unit of the inventory control system.

9. The system of claim 8 wherein the network device is in communication with a second inventory control system.

10. The system of claim 1 further comprising a computing device operatively coupled to the data processing unit.

11. The system of claim 10 wherein the computing device comprises a tablet, wherein the tablet is mounted on a swivel arm operatively coupled to a tool box comprising the first moveable drawer.

12. The system of claim 1 wherein the first sensor array is arranged in an outline form of the first item.

13. The system of claim 1 wherein the first sensor array comprises a plurality of Infra Red (IR) sensors.

14. The system of claim 1 wherein the first sensor array further comprises a flexible printed circuit board wherein the plurality of daughter boards are operatively coupled to the printed circuit board.

15. The system of claim 1 wherein the coating sheet comprises a multi-layered plastic sheet.

16. The system of claim 1 wherein the inventory condition of the first item comprises a present condition.

17. The system of claim 1 wherein the inventory condition of the first item comprises an absent condition.

18. The system of claim 1 wherein the inventory condition of the first item represents a condition of whether the first item resides within the first cut out of the foam overlay.

19. The system of claim 1 wherein the inventory condition of the first item comprises a reordering condition.

* * * * *